(12) United States Patent
Eisenhower et al.

(10) Patent No.: US 6,993,921 B2
(45) Date of Patent: Feb. 7, 2006

(54) MULTI-VARIABLE CONTROL OF REFRIGERANT SYSTEMS

(75) Inventors: Bryan A. Eisenhower, East Hartford, CT (US); Julio Concha, Rocky Hill, CT (US)

(73) Assignee: Carrier Corporation, Farmington, CT (US)

( * ) Notice: Subject to any disclaimer, the term of this patent is extended or adjusted under 35 U.S.C. 154(b) by 23 days.

(21) Appl. No.: 10/793,542

(22) Filed: Mar. 4, 2004

(65) Prior Publication Data

US 2005/0193752 A1 Sep. 8, 2005

(51) Int. Cl.
*F25B 41/00* (2006.01)
*F25B 27/00* (2006.01)
*F25D 17/00* (2006.01)

(52) U.S. Cl. ............... 62/209; 62/180; 62/236

(58) Field of Classification Search ........... 62/208, 62/209, 210, 211, 236, 180

See application file for complete search history.

(56) References Cited

U.S. PATENT DOCUMENTS

| 5,568,377 | A | 10/1996 | Seem |
| 5,735,134 | A | 4/1998 | Liu |
| 6,253,113 | B1 | 6/2001 | Lu |
| 6,264,111 | B1 | 7/2001 | Nicolson |
| 6,505,475 | B1 * | 1/2003 | Zugibe et al. ............ 62/192 |
| 2003/0136138 | A1 * | 7/2003 | Tsuboi et al. ............ 62/244 |

OTHER PUBLICATIONS

Dorf, Richard C., Modern Control Systems, 1981, Addison-Wesley Publishing Company, pp. 2, 3, 81, 82.*

* cited by examiner

*Primary Examiner*—Marc Norman
(74) *Attorney, Agent, or Firm*—Carlson, Gaskey & Olds

(57) ABSTRACT

A control particularly useful for a hot water heating system, includes calculation of a desired leaving water temperature for water leaving a hot water heat exchanger, and a desired refrigerant condition for most efficiently achieving the desired leaving water temperature. A control looks at both desired variables and compares them to actual variables to determine an error for each. The control includes an error correction algorithm for each of the two variables that takes into account both of the errors, the integral of both of the errors, and the derivative of both of the errors. In this way, sensitivity in the error correction for one variable due to changes in the other variable is reduced, and the system functions more efficiently.

12 Claims, 1 Drawing Sheet

MULTI-VARIABLE CONTROL OF REFRIGERANT SYSTEMS

BACKGROUND OF THE INVENTION

This application relates to a unique control and method for correcting errors in at least two different variables in a refrigerant system, wherein each of two error correction algorithms take into account an error signal from both variables.

Refrigerant systems typically include a compressor for compressing a refrigerant and a first heat exchanger receiving the refrigerant. Downstream of the first heat exchanger is an expansion device that expands the refrigerant. Adjustable expansion devices are known, that can be opened to varying amounts to change refrigerant pressure throughout the system. From the expansion device, the refrigerant travels to a second heat exchanger and then back to the compressor.

A control for the system is operable to take in inputs, such as a user demand for a particular hot water temperature at a faucet. Other applications may be to achieve a temperature in an environment conditioned by the refrigerant cycle (air conditioning or heat pump), and control aspects of the refrigerant cycle to achieve the demanded temperature. As an example, in one use of a refrigerant cycle, the first heat exchanger is utilized to heat water. Among the uses may be a hot water system for heating water.

In a hot water system, a control takes in an operator demand for a particular water temperature, and controls the amount of water flowing through the first heat exchanger. The more water that flows through the first heat exchanger, the lesser the temperature of the hot water at the outlet. Thus, to achieve higher temperatures for the water, the volume of water flow is reduced.

Further, and again to achieve the desired temperature demanded for the hot water, the refrigerant circuit must be controlled to provide sufficient heat at the first heat exchanger to heat the water to the desired temperature. Thus, two aspects of the hot water circuit must be controlled; the amount of water flowing through the first heat exchanger, and also an aspect of the refrigerant cycle. The amount of water delivered to the first heat exchanger can be controlled by controlling the speed of the water pump. In one embodiment, the refrigerant cycle is controlled in a system developed by the assignee of this application, by controlling the expansion device to provide a desired discharge pressure. Of course, a desired temperature or other condition could also be provided.

The controls for controlling the two variables, e.g., water pump speed and expansion device opening, typically have each taken into account an error, an integral of that error, and a derivative of this error. Such controllers are known as PID controllers. This type of controller is quite useful in controlling a condition, and providing feedback to adjust the condition such that it remains as desired. Such controls are known as single input, single output or "SISO." These systems are somewhat sensitive to variations in some of the variables surrounding the system, as examples, ambient air temperature, the temperature of the water entering the heat exchanger, etc.

There is another deficiency in the above described control when the two control variables have an impact on each other. That is, as one of the variables, e.g., water pump speed, changes, it will change the pressure, yet the error correction algorithm for one variable does not anticipate the impact changes to the other will cause, until after the change has occurred. Thus, the efficiency of the overall system may not be as high as would be desired, in that each of the two variables would be sensitive to change in the other.

SUMMARY OF THE INVENTION

In a disclosed embodiment of this invention, a PID control calculates error correction values for each of two variables. The variables interact in such a way that a change in one results in a change in the other. An error correction algorithm for each of the variables considers the error in the other variable. Thus, the two error correction algorithms are better able to predict necessary change, by including a prediction of the change in the other variable.

While this control technique has wide application, in particular it is utilized in a system for supplying hot water. A main disclosed application is in a hot water heating system, where one of the variables is the speed of the water pump for moving the water through a first heat exchanger, and the other variable is a refrigerant condition within a refrigerant circuit for heating the water in the first heat exchanger. In the disclosed embodiment, the refrigerant condition is the discharge pressure of the refrigerant downstream of the compressor, and this variable is controlled by opening the expansion device. As the expansion device is closed down, pressure will increase. As the pressure increases, so does the temperature. Thus, as the refrigerant pressure is increased, it is likely that the temperature of the hot water leaving the first heat exchanger ("LWT") would also increase. LWT is also controlled by varying the water pump speed, and thus as the refrigerant pressure increases, the pump speed may not need to decrease as much as would have previously been expected to achieve a demanded LWT. Thus, by considering the errors in both variables, the control is better able to adjust each of the variables more quickly to reach the desired states.

These and other features of the present invention can be best understood from the following specification and drawings, the following of which is a brief description.

DETAILED DESCRIPTION OF THE PREFERRED EMBODIMENT

Figure 1:
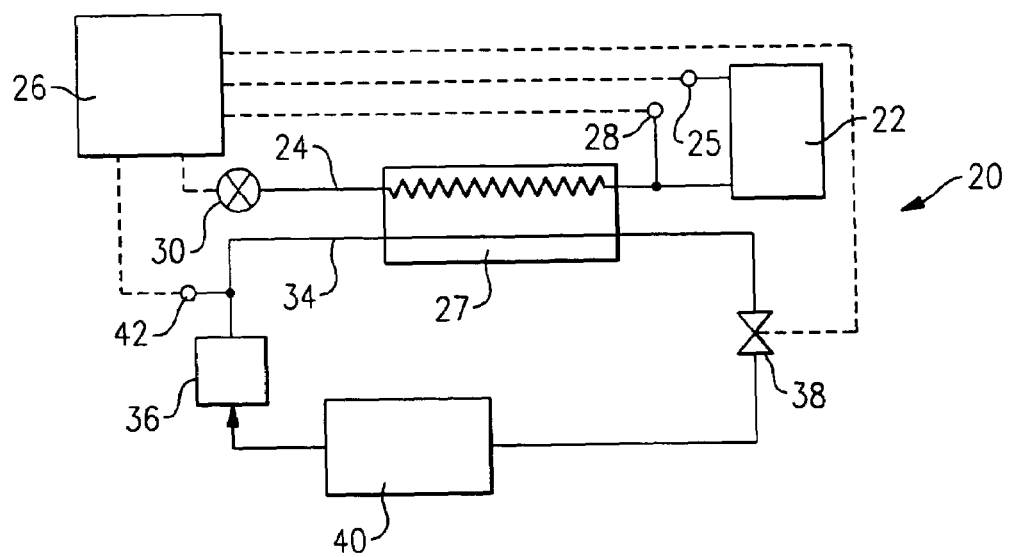
FIG. 1 schematically shows a hot water heating system incorporating this invention.

A system 20 is illustrated in FIG. 1 for controlling the temperature at an end use 22, such as a faucet. As known, a user of use 22 may set a desired temperature such as through a handle 25. Hot water is supplied to a first heat exchanger 27 from a hot water supply line 24 to control the temperature at use 22 and meet the desired temperature. Such systems are known in the art, and the operation of this system forms no part of this invention.

Feedback from handle 25 goes to a central control 26. Further, the discharge temperature 28 (LWT) of the hot water 24 leaving first heat exchanger 27 is also provided as feedback to controller 26. The controller can identify a desired LWT based upon the demanded temperature from handle 25. Actual LWT 28 is provided to the control 26, and control 26 is operable to control the variable of the hot water supply system to adjust actual LWT 28 to meet the desired LWT. One such variable is the speed of the water pump 30, for moving the water through a first heat exchanger 27, and to use 22. As the pump motor speed 30 decreases, the amount of water flowing through the heat exchanger 27 also decreases, and thus the water is heated to a greater temperature than if the speed of pump 30 is higher.

At the same time, a refrigerant 34 is flowing through the first heat exchanger 27 to heat the water. As known, the refrigerant is compressed by a compressor 36, delivered to the first heat exchanger 27, and then to an expansion device 38. Expansion device 38 is adjustable, such that the size of its orifice can be adjusted to control conditions of the refrigerant 34. Downstream of the expansion device 38 the refrigerant moves through a second heat exchanger 40. From second heat exchanger 40, the refrigerant returns to compressor 36.

A system condition that is disclosed for controlling the condition of the refrigerant 34 is the discharge pressure 42, downstream of the compressor 36. Control 26 is operable to identify a desired pressure, and compare the actual discharge pressure at 42 to this desired discharge pressure. The control 26 adjusts the expansion device 38 to achieve change in the actual discharge pressure 42 such that it moves toward the desired discharge pressure. A method of determining the desired discharge pressure is disclosed in co-pending patent application Ser. No. 10/793,489, filed on even date herewith, and entitled "Pressure Regulation in a Transcritical HVAC System."

Preferably, not only the error between actual LWT and the desired LWT is taken, but the control 26 preferably also takes the derivative of that error, and the integral of that error. The same is true of an error between the desired and actual 42 discharge pressure. Such controls are known as PID controllers, and are well known in the art.

With the system illustrated in FIG. 1, there is some challenge in controlling the two variables, in that a change in one variable results in a change in the other. Thus, as for example, if refrigerant discharge pressure changes, it will in turn affect the LWT 28. Further, a change in the amount of water flowing through the first heat exchanger 27 will change how much heat is taken out of the refrigerant 34, and thus impact upon the discharge pressure 42. To date, the two variables are controlled independently, and thus are sensitive to changes in each variable, such that reaching the desired steady state sometimes take longer than would be desired, and overall system efficiency is effected.

Generally, the desired discharge pressure to achieve the desired LWT is based upon various experimental data developed (as disclosed in the above-referenced patent application) to achieve the highest co-efficient of performance (COP), or the highest system efficiency. Thus, losing efficiency by not properly controlling the system would harm one of the main goals of having selected the desired pressure.

The refrigerant 34 is preferably a refrigerant capable of operation as part of a transcritical cycle. In one disclosed embodiment, the refrigerant is CO2. In a transcritical cycle, compressor discharge pressure is not dictated by saturation properties, and thus the above-referenced patent application provides a method of achieving a good deal of control over the overall cycle.

Figure 2:
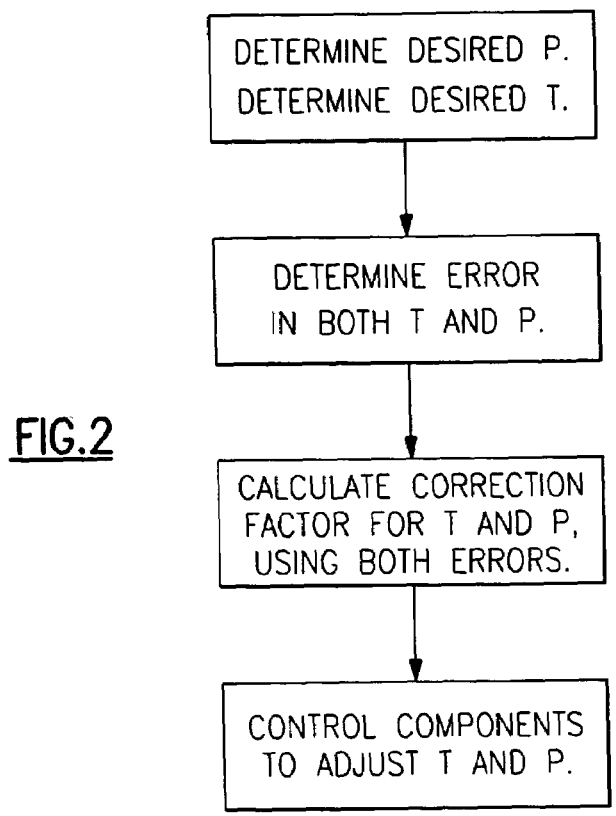
FIG. 2 is a flowchart for this invention.

However, the problem of two variables might make achieving the efficiency goals somewhat difficult. The present invention improves upon the independent control of the two variables by incorporating the error signal from each of the variables into both error correction algorithms. A basic flowchart is provided at FIG. 2. In the disclosed algorithms, the correction factor for both the hot water temperature and the refrigerant pressure includes both errors, a derivative of both errors, and the integral of both errors. The several factors are weighted by different constants, but are considered in each. Disclosed error correction algorithms for the adjustment of the expansion valve signal $u_{EXV}$, and the control signal for the water pump speed, $u_{VSP}$, are as follows:

$$u_{EXV} = Kp_{11}e_P + Kp_{12}e_t + Ki_{11}\int e_P dt + Ki_{12}\int e_T dt + Kd_{11}\frac{de_P}{dt} + Kd_{12}\frac{de_T}{dt}$$

$$u_{VSP} = Kp_{21}e_P + Kp_{22}e_T + Ki_{21}\int e_P dt + Ki_{22}\int e_T dt + Kd_{21}\frac{de_P}{dt} + Kd_{22}\frac{de_T}{dt}$$

$e_p$ is the pressure error, i.e., the difference between actual and desired compressor discharge pressure. $e_t$ is the temperature error, i.e., the difference between actual and desired delivery water temperature. $K_{p11}$, $K_{p12}$, ... etc., are numerical constants. The constants K would be selected based upon the system, and also based upon the expected change that a particular change in water pump speed, for example, would have on the pressure. There are many methods for choosing the constants. The preferred method is the $H_\infty$ ("H infinity") design method, as explained for example in the textbook "Multivariable Feedback Design" by J. M. Maciejowski (Addison-Wesley, 1989). Note that according to these equations, $u_{EXV}$ and $u_{VSP}$ depend both on the current pressure and the current temperature. This is what makes the controller "multivariable." A "single-variable" controller would have $u_{EXV}$ depend only on the pressure and $u_{VSP}$ depend only on the temperature.

In addition, there is preferably an adjustment to provide for correction and avoiding a particular condition wherein both the error for water temperature, and the derivative of the error are negative. This algorithm essentially utilizes an error that is the multiple of the detected error multiplied by the derivative of the detected error when both are negative. In this way, an otherwise potentially inefficient condition can be avoided. Details of this correction algorithm are disclosed in U.S. patent application Ser. No. 10/793,486, filed on even date herewith, and entitled Non-Linear Control Algorithm in Vapor Compression Systems.

Control 26 reads the current values of pressure and temperature from the corresponding sensors, computes $u_{EXV}$ and $u_{VSP}$ using the formula above, and sends these values to the expansion valve and water pump respectively. This procedure is repeated periodically (for example, every two seconds).

Essentially, the error correction algorithms above consider the error in both variables for calculating a correction factor for each variable. In this way, the correction factor anticipates the change in the other variable.

Of course, other error correction algorithms are within the scope of this invention. The invention broadly extends to the concept of controlling two variables with an error correction algorithm that incorporates error information for both variables into each error correction algorithm. Also, any type of suitable control may be used.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigerant cycle comprising:
   a compressor for compressing a refrigerant;
   a first heat exchanger downstream of said compressor, said first heat exchanger receiving refrigerant from said compressor, and said first heat exchanger further changing the temperature of a second fluid to be conditioned by said refrigerant in said first heat exchanger;
   an expansion device downstream of said first heat exchanger;
   a second heat exchanger downstream of said expansion device, and said refrigerant flowing from said compressor to said first heat exchanger, through said expansion device, said second heat exchanger, and back to said compressor; and
   a control for monitoring a variable condition of said refrigerant, and a variable condition of the second fluid at said first heat exchanger, said controller determining a desired value for each of said two variable conditions, and monitoring an actual value of each of said two variable conditions, said control having an error correction algorithm for determining a correction factor for each of said two variable conditions, each of said error correction algorithms utilizing a determined error for both of said variable conditions.

2. A refrigerant cycle as set forth in claim 1, wherein said second fluid is water to be utilized by a hot water hearing system.

3. A refrigerant cycle as set forth in claim 2, wherein said variable condition of said second fluid is a leaving water temperature leaving said first heat exchanger, and based upon a desired temperature demanded by a user of said hot water heating system.

4. A refrigerant cycle as set forth in claim 3, wherein said error correction algorithm each look at a determined error, and an integral of each of said determined errors, and a derivative of each of said determined errors.

5. A refrigerant cycle as set forth in claim 4, wherein said refrigerant condition is changed by changing an opening of said expansion device.

6. A refrigerant cycle as set forth in claim 5, wherein said error correction algorithms calculate a correction factor for driving a hot water heat pump as $u_{EXV}$, and a degree of opening of an expansion device $u_{VSP}$, and said algorithms are as follows:

$$u_{EXV} = Kp_{11}e_P + Kp_{12}e_t + Ki_{11}\int e_p dt + Ki_{12}\int e_T dt + Kd_{11}\frac{de_p}{dt} + Kd_{12}\frac{de_T}{dt}$$

$$u_{VSP} = Kp_{21}e_P + Kp_{22}e_T + Ki_{21}\int e_p dt + Ki_{22}\int e_T dt + Kd_{21}\frac{de_P}{dt} + Kd_{22}\frac{de_T}{dt}$$

wherein $e_P$ is an error in said condition controlled by said expansion device, and $e_T$ is an error in said leaving water temperature, and the K factors are constants calculated for said cycle.

7. A refrigerant cycle as set forth in claim 1, wherein said error correction algorithm each look at a determined error, and an integral of each of said determined errors, and a derivative of each of said determined errors.

8. A refrigerant cycle as set forth in claim 1, wherein said refrigerant condition is changed by changing an opening of said expansion device.

9. A method of operating a refrigerant cycle comprising:
   (1) providing a compressor for compressing a refrigerant, a first heat exchanger downstream of said compressor, said first heat exchanger receiving refrigerant from said compressor, and said first heat exchanger further receiving a second fluid to be conditioned by said refrigerant in said first heat exchanger, an expansion device downstream of said first heat exchanger, a second heat exchanger downstream of said expansion device, and said refrigerant flowing from said compressor to said first heat exchanger, through said expansion device, said second heat exchanger, and back to said compressor, and a control for monitoring a variable condition of said refrigerant, and also monitoring a variable condition of the second fluid at said first heat exchanger, said controller determining a desired value for each of said two variable conditions, and monitoring an actual value of each of said two variable conditions, said control having an error correction algorithm for determining a correction factor for each of said two variable conditions, each of said error correction algorithms utilizing a determined error for both of said variable conditions;
   (2) determining an error for both of said variable conditions and calculating an error signal using said error correction algorithms; and
   (3) adjusting system components based upon said error signals.

10. A system comprising:
    a first component having a desired variable condition and a second component having a desired variable condition, said first and second desired variable conditions being related to each other such that a change in one of said desired variable conditions is likely to change the other of said desired variable conditions; and
    a controller for achieving said desired variable conditions, said controller receiving feedback of an actual condition of said desired variable conditions, and a desired condition for each of said desired variable conditions, said controller including an error correction algorithm for determining a correction factor for each of said desired variable conditions, said error correction algorithms for each of said variables looking at a determined error in both of said variable conditions, and also considering a derivative of the determined error, and an integral of the determined error for both of said variable conditions in calculating said error correction algorithm for at least one of said variables.

11. The system as set forth in claim 10, wherein said determined error, said derivative of said determined error, and said integral of said determined error are utilized for both of said variable conditions in calculating each of said error correction algorithms.

12. The system as set forth in claim 10, wherein said desired variable condition of said first component relates to a first fluid and said desired variable condition of said second component relates to a second fluid.

* * * * *